United States Patent [19]
Freund

[11] Patent Number: 5,933,667
[45] Date of Patent: Aug. 3, 1999

[54] VIEWFINDER MASK FOR A PHOTOGRAPHIC CAMERA, VIEWFINDER, AND CAMERA

[75] Inventor: Michael N. Freund, Adelberg, Germany

[73] Assignee: Eastman Kodak Company, Rochester, N.Y.

[21] Appl. No.: 09/120,650

[22] Filed: Jul. 22, 1998

[30] Foreign Application Priority Data

Aug. 28, 1997 [DE] Germany .......................... 197 37 484

[51] Int. Cl.⁶ ...................................................... G03B 17/24
[52] U.S. Cl. ............................................ 396/379; 396/380
[58] Field of Search ..................................... 396/378, 380, 396/381, 435, 436, 379

[56] References Cited

U.S. PATENT DOCUMENTS 4,945,372  7/1990  Higuchi et al. ....................... 396/379
5,530,510  6/1996  Alligood ............................... 396/380

FOREIGN PATENT DOCUMENTS 1 214 079  4/1996  Germany .

*Primary Examiner*—David M. Gray
*Attorney, Agent, or Firm*—Robert Luke Walker

[57] ABSTRACT

A viewfinder mask, viewfinder and photographic camera. The viewfinder mask connects to a camera lens for adjusting the image field of the viewfinder to the adjustable focal length of the camera lens. The viewfinder mask comprises an L-shaped frame part and a rectangular frame part covering the latter, these being linked by a film hinge. A guide lever engages on the one hand a corner of the rectangular frame part and on the other hand, in the area of the film hinge, the L-shaped frame part. The frame parts are mounted movably in relation to one another inside the case.

21 Claims, 2 Drawing Sheets

5,933,667

VIEWFINDER MASK FOR A PHOTOGRAPHIC CAMERA, VIEWFINDER, AND CAMERA

FIELD OF THE INVENTION

The invention relates to viewfinders and photographic cameras and a viewfinder mask connected to a camera lens for adjusting the image field of the viewfinder to the adjustable focal length of the camera lens.

BACKGROUND OF THE INVENTION

Known camera viewfinders are provided with means for adjusting the image field to those of the lens of the camera. For example, still cameras are provided with viewfinders whose entrance apertures can be altered by changing the mask and adapted to the various focal lengths of the lenses used in the camera. Each mask aperture however corresponds only to a certain focal length setting.

In photographic cameras featuring lenses with continuously changing focal length, i.e. so-called zoom lenses, it is desirable to have continuously changing viewfinders too, that are linked to the zoom lens such that the image field observed in the viewfinder corresponds precisely to that of the light-sensitive surface of the film.

Viewfinders provided with continuously adjustable framing masks and capable of connection to zoom lenses are known, for example from DE-PS-12 14 079. The known masks, in which all four sides of the frame are simultaneously adjustable, require however complicated devices that prohibit a simple and dependable mode of operation. Furthermore, devices of this complexity are relatively expensive and not suitable for use in cameras of very simple design, such as so-called single-use cameras.

The use of a viewfinder not adjusted to the lens focal length leads to unacceptable photographic results when it is remembered that wide-angle lenses have an angle of view exceeding 90°, while telephoto lenses have less than 25°.

SUMMARY OF THE INVENTION

The object underlying the present invention is therefore to provide a viewfinder mask of simple design, with few components and dependable operation, for adjusting the viewfinder's image field to the focal length of the camera lens used.

This object is attained in accordance with the invention for a viewfinder of the generic type in that the viewfinder mask comprises an L-shaped frame part and a rectangular frame part covering the latter, these being linked by a film hinge, in that a guide lever flexibly engages on the one hand a corner of the rectangular frame part and on the other hand, in the area of the film hinge, the L-shaped frame part and rests pivotably on a bearing pin on the case side, and in that the frame parts are mounted movably in relation to one another inside the case depending on the focal length of the case.

Since this viewfinder mask comprises a single-piece, flat injection-molded plastic component, the object is achieved in outstanding fashion. In addition, adaptation of the viewfinder's image field aperture is achieved continuously using the focal length adjuster of the camera lens by a projection fixed to the corner of the L-shaped frame part opposite that corner of the rectangular frame part which the guide lever engages. The projection cooperates with a cam controlled by the camera lens as a function of the set focal length. During this adjusting movement, the two frame parts move, relative to each other, on the diagonal between the cam and the linking point of the guide lever on the rectangular frame part.

In detail, the invention is such that the viewfinder mask has an inner mask part including the L-shaped frame part and an arm, and an outer mask part including the rectangular frame part and an arm. The arms are connected at their free ends to form the film hinge.

An embodiment of this type facilitates the manufacture of the final form of the viewfinder mask and saves considerable time during the installation thereof into the viewfinder.

In an advantageous modification, the frame parts have sliding surfaces to which guide surfaces provided inside the case are allocated, and the guide lever rests pivotably on a bearing pin on the case side.

Advantageously, a spring element is provided on the arm of the L-shaped frame part and is in flexible contact with that surface of the guide lever opposite the bearing pin in the operating state of the viewfinder mask.

As a result of this measure, the projection of the L-shaped frame part is always up against the lens-controlled cam and the frame parts can return automatically to their maximum aperture position.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
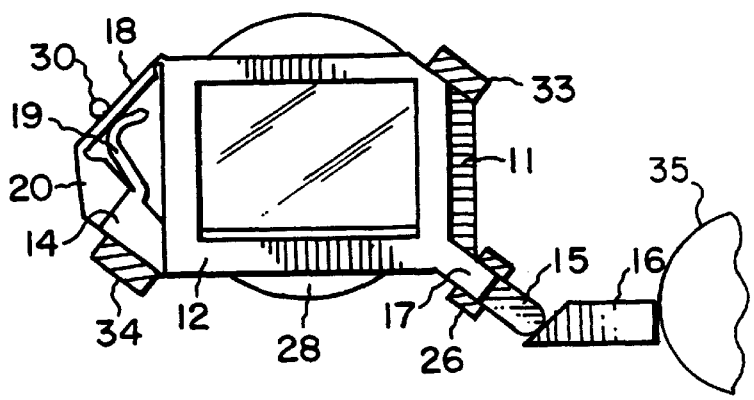
FIG. 1 is a diagrammatical view of an embodiment of the viewfinder mask. The mask is shown in its operating state and an initial position. Some components of the camera are also shown. The camera lens is illustrated by an incomplete circle.

The viewfinder mask shown in the drawings continuously adjusts the image field of the viewfinder to the variable focal length of a camera lens.

The viewfinder mask 100 shown as an embodiment is made as a flat injection-molded plastic component and comprises an inner mask part 11a and an outer mask part 12a. The inner mask part 11a has an L-shaped frame part 11 and an arm 13. The outer mask part 12a has a rectangular frame part 12 and an arm 14. The arms 13 and 14 are linked to one another by a hinge 20. In this way, the frame parts 11 and 12 can be folded over one another to form a complete mask in their operating state inside the camera viewfinder 10.

Figure 2:
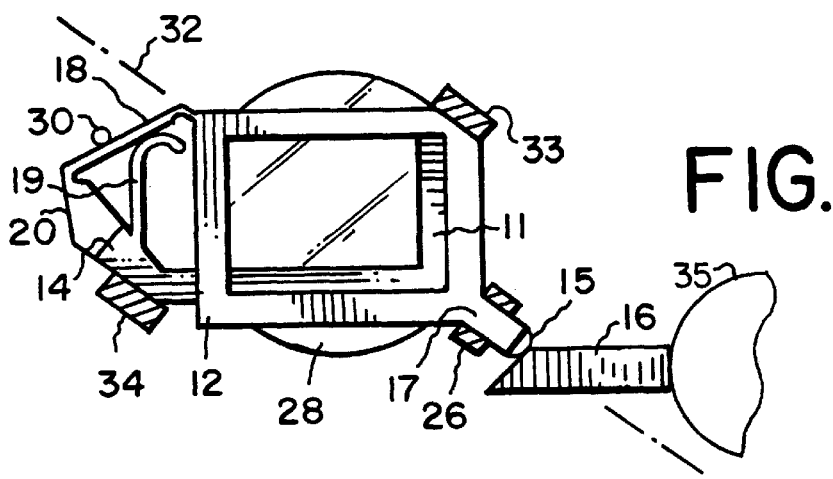
FIG. 2 is the same view as FIG. 1, but the viewfinder mask is in another position, in which the image field of the viewfinder is reduced in size.
Figure 3:
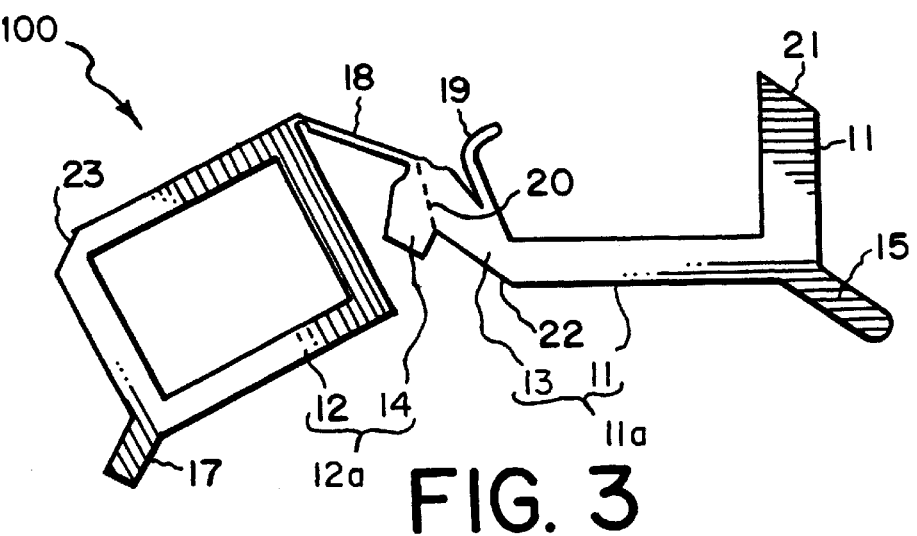
FIG. 3 is a front view of the viewfinder mask of FIG. 1 in an unfolded state.

In the area of its corner, the inner mask part 11 a has a projection 15 guided in a bearing 26 on the side of the case 25 of the viewfinder 10 and having a rounded-off free end that cooperates with a cam 16 controlled by the focal length adjustment of the camera lens 35. In FIGS. 1 and 2, the focal length of the camera lens 35 is varied, changing the dimension of the portion of cam 16 in contact with projection 15.

The outer mask part 12a has in the area of one corner a guide arm 17 that in the folded-over state of the mask parts 11a and 12a overlaps the projection 15 flush at the side while leaving the rounded-off free end section of projection 15 free.

At the corner of the rectangular frame part 12 diagonally opposite the corner joined to the guide arm 17, a guide lever 18 is linked. The other end of guide lever 18 is flexibly jointed in the area of the film hinge 20.

A spring element 19 is integrally molded onto the arm 13 of the inner mask part 11a; and in the operating state of the viewfinder mask 100, is in contact with the inner surface of the guide lever 18 facing the frame part 12. The spring element 19 is flexibly pretensioned and biases the mask parts 11a, 12a toward an initial position.

On the mask parts 11a and 12a, aligned sliding surfaces 21, 22, and 23 are provided. The sliding surfaces 21, 22, 23 are parallel to an imaginary diagonal 32 of the image field section, which passes through the extension of the projection 15. The sliding surfaces 21, 22 and 23 work with guide surfaces 33 and 34 of the case 25. The guide lever 18 is pivotably in contact with a bearing pin 30 fixed on the case 25.

Figure 4:
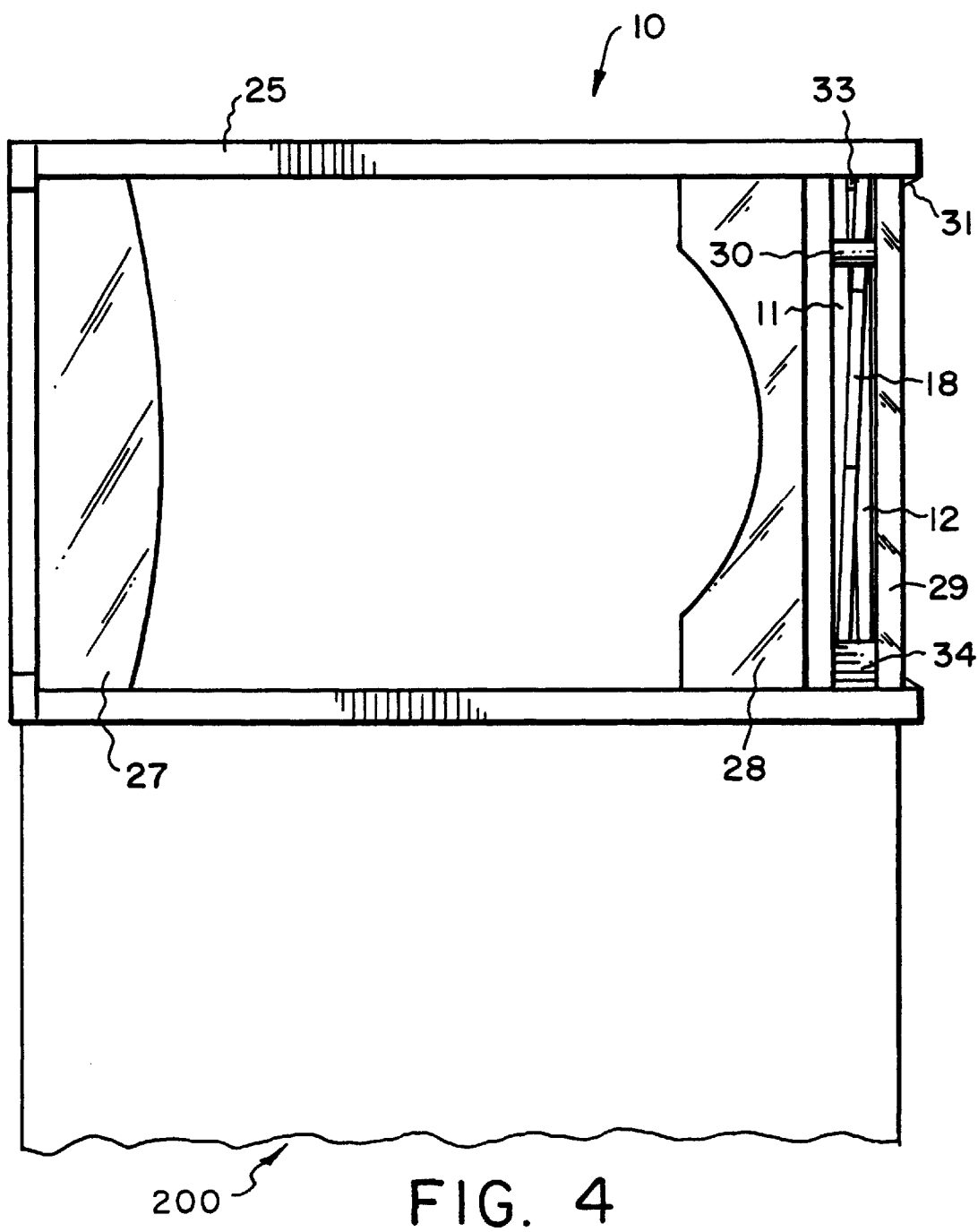
FIG. 4 is a semi-diagrammatical view of the viewfinder and camera of FIG. 1 with the viewfinder mask installed.

The camera viewfinder 10 and camera 200 are shown diagrammatically in FIG. 4. The camera viewfinder 10 is integrated into the body of the camera 200. A viewfinder eyepiece 27 and a viewfinder front lens 28 are provided. The viewfinder mask 100 comprising the folded-over frame parts 11 and 12 is arranged in front of the front lens 28 and held in its operating state by a transparent plane-parallel plate 29. The plate 29 is held in position by elastic snap-in elements 31.

During adjustment of the focal length of the camera lens 35, force is exerted via an inclined surface of the cam 16 on the projection 15 such that the L-shaped frame part 11 moves in a direction along the imaginary diagonal 32. At the same time, the guide lever 18 is swiveled (clockwise in FIGS. 1–2) against the bearing pin 30 via the arms 13 and 14 (connected by the film hinge 20) such that the frame part 12 is moved by the same amount along the diagonal and in the opposite direction to the frame part 11. This movement leads to an infinitely variable adjustment of the viewfinder image field to the focal length set at the camera lens.

The invention has been described in detail with particular reference to certain preferred embodiments thereof, but it will be understood that variations and modifications can be effected within the spirit and scope of the invention.

What is claimed is:

1. A viewfinder mask for use with a camera, said viewfinder mask being connected to an adjustable focal length camera lens for adjusting the image field of a camera viewfinder along with the adjusting of the focal length of the camera lens, the viewfinder mask comprising: an L-shaped frame part, and a rectangular frame part covering said L-shaped frame part, and a film hinge linking said frame parts, said frame parts being movable in relation to one another responsive to the adjusting of the focal length of the camera lens.

2. A viewfinder mask according to claim 1, further comprising an inner mask part including said L-shaped frame part and a first arm, and an outer mask part including said rectangular frame part and a second arm, said arms each have an end, and said ends being joined to form said film hinge.

3. A viewfinder mask according to claim 1, further comprising a guide lever joined to said film hinge and flexibly engaging a corner of said rectangular frame part.

4. A viewfinder mask according to claim 3, further comprising a spring element disposed in flexible contact with said guide lever.

5. A viewfinder mask according to claim 1, characterized in that the viewfinder mask comprises a single-piece, flat injection-molded plastic component.

6. A viewfinder for use in a photographic camera having an adjustable focal length camera lens, said viewfinder comprising:
    a viewfinder mask including: an L-shaped frame part, and a rectangular frame part covering the L-shaped frame part, and a film hinge linking said frame parts, said frame parts being movable in relation to one another responsive to the adjusting of the focal length of the camera lens; and
    a case supporting said viewfinder mask.

7. A viewfinder according to claim 6, wherein said case has a bearing pin and said viewfinder mask further comprises a guide lever joined to said film hinge and flexibly engaging a corner of said rectangular frame part, said guide lever resting pivotably on said bearing pin.

8. A viewfinder according to claim 7, further comprising a spring element disposed in flexible contact with said guide lever opposite said bearing pin.

9. A viewfinder according to claim 7, wherein said case has guide surfaces inside and said viewfinder mask has sliding surfaces slideably engaging said guide surfaces.

10. A viewfinder according to claim 7 further comprising a front lens and a plane-parallel transparent plate, said viewfinder mask being held between said front lens and said plate.

11. A photographic camera comprising:
    an adjustable focal length camera lens;
    a viewfinder comprising:
        a viewfinder mask including: an L-shaped frame part, and a rectangular frame part covering said L-shaped frame part, and a film hinge linking said frame parts, said frame parts moving responsive to the adjusting of the focal length of the camera lens; and
        a case supporting said viewfinder mask in operative relation to said camera lens.

12. A camera according to claim 11 further comprising a cam controlled by said camera lens as a function of focal length, wherein said frame parts are movable in relation to one another by said cam responsive to the adjusting of the focal length of the camera lens.

13. A camera according to claim 12 wherein said viewfinder mask includes a projection fixed to said L-shaped frame part, said projection cooperating with said cam to move said frame parts relative to one another responsive to the adjusting of the focal length of said camera lens.

14. A viewfinder mask for use with a camera, said viewfinder mask being connected to an adjustable focal length camera lens for adjusting the image field of the camera viewfinder along with the adjusting of the focal length of the camera lens, the viewfinder mask comprising an inner mask part including an L-shaped frame part, and an outer mask part including a rectangular frame part covering the L-shaped frame part, and a film hinge linking said frame parts, said frame parts being movable in relation to one another responsive to the adjusting of the focal length of the camera lens.

15. A viewfinder mask according to claim 14, wherein said mask parts each have an arm, said arms each have an end, and said ends are connected to form said film hinge.

16. A viewfinder mask according to claim 15, wherein the camera has a bearing pin and said viewfinder mask further comprises a guide lever joined to the film hinge and flexibly engaging a corner of said rectangular frame part, said guide lever resting pivotably on said bearing pin.

17. A viewfinder mask according to claim 16, further comprising a spring element disposed in flexible contact with the guide lever opposite the bearing pin.

18. A viewfinder mask according to claim 17, wherein said camera has a cam controlled by the camera lens as a function of the camera lens focal length and said outer mask part has a projection fixed to the L-shaped frame part opposite said corner flexibly engaged by said guide lever, said projection cooperating with said cam to move said frame parts relative to one another responsive to the adjusting of the focal length of the camera lens.

19. A viewfinder mask according to claim 18, wherein the camera has a case and guide surfaces inside the case and the mask parts have sliding surfaces slideably engaging the guide surfaces.

20. A viewfinder mask according to claim 19, characterized in that the viewfinder mask comprises a single-piece, flat injection-molded plastic component.

21. A viewfinder comprising a front lens, a plane-parallel transparent plate, and the viewfinder mask of claim 20 held between said front lens and said plate.

* * * * *